(12) United States Patent
Blazek

(10) Patent No.: US 7,048,965 B2
(45) Date of Patent: May 23, 2006

(54) SURFACE-COVERING ARTICLE AND METHODS OF INSTALLING THE SAME

(76) Inventor: Felisa Blazek, 5 Squamscott Rd., Stratham, NH (US) 03885

( * ) Notice: Subject to any disclaimer, the term of this patent is extended or adjusted under 35 U.S.C. 154(b) by 0 days.

(21) Appl. No.: 10/856,070

(22) Filed: May 28, 2004

(65) Prior Publication Data

US 2004/0241413 A1   Dec. 2, 2004

Related U.S. Application Data

(60) Provisional application No. 60/474,287, filed on May 30, 2003.

(51) Int. Cl.
  *B05D 7/00*  (2006.01)
(52) U.S. Cl. .................. 427/217; 156/278; 156/280; 156/304.1; 156/307.3; 156/307.5; 264/446
(58) Field of Classification Search ............. 427/201, 427/202, 136, 140, 214, 180; 156/278, 279; 428/359, 690, 364, 397, 297.4, 401, 402, 428/323, 332; 442/417
See application file for complete search history.

(56) References Cited

U.S. PATENT DOCUMENTS

| | | | |
|---|---|---|---|
| 4,057,664 A | 11/1977 | Audykowski | |
| 4,126,727 A | 11/1978 | Kaminski | |
| 4,153,743 A | 5/1979 | Caramanian | |
| 4,391,664 A | 7/1983 | Kramer | |
| 4,595,626 A | 6/1986 | Brubaker et al. | |
| 4,657,664 A | 4/1987 | Evans et al. | |
| 5,059,474 A * | 10/1991 | Yoshida | 428/174 |
| 5,118,547 A | 6/1992 | Chen | |
| 5,174,818 A | 12/1992 | Symons | |
| 5,627,231 A | 5/1997 | Shalov et al. | |
| 6,468,585 B1 | 10/2002 | Tippmann et al. | |
| 6,716,482 B1 * | 4/2004 | Morton | 427/201 |

OTHER PUBLICATIONS

Riesterer, Wilfried; "Floors that call for radical solutions"; Plant Services; Nov. 1996, 4 pgs; Waterbury, CT.
Silikal Resin Systems, Inc.; "Seafood processor covers all bases with improved flooring technology"; Food Engineering Magazine; Feb. 1997; 1 pg; Waterbury, CT.

* cited by examiner

*Primary Examiner*—Merrick Dixon
(74) *Attorney, Agent, or Firm*—Guerin & Rodriguez, LLP; Michael A. Rodriguez

(57) ABSTRACT

A surface-covering article and method of installing the same are described. The surface-covering article includes a top layer, a bottom layer, and reinforcing layer. The top layer is made of a first type of resin. The bottom layer is made of a second type of resin. The second type of resin of the bottom layer chemically bonds with the first type of resin of the top layer to join the bottom layer and the top layer. The reinforcing layer is disposed between the top layer and bottom layer and includes a material to distribute a load force throughout the reinforcing layer when the load force is applied to the surface-covering article.

17 Claims, 4 Drawing Sheets

SURFACE-COVERING ARTICLE AND METHODS OF INSTALLING THE SAME

RELATED APPLICATION

This application claims the benefit of U.S. Provisional Patent Application No. 60/474,287 filed on May 30, 2003, the entire contents of which are incorporated herein by reference.

FIELD OF THE INVENTION

The invention relates to surface coverings. More specifically, the invention relates to a seamless surface covering and method of installing the same.

BACKGROUND OF THE INVENTION

A variety of surface covering products (e.g., tiles, sheets, planks, and the like) are widely used in the building industry. Surface covering products are either natural (e.g., stone, wood, ceramic, and mineral bodies) or man-made (e.g., laminates and plastics). The man-made surface coverings are often fabricated to appear like a natural material. For example, vinyl tiles can include a pattern that imitates the look of marble or wood.

Although some man-made surface coverings can be resilient under foot, they typically are not designed with weight distribution in mind. As such, some man-made surface coverings tend to warp or displace when a load force is applied to the surface. The warping and displacement results in an unlevel surface. Natural tiles share in these disadvantages and are traditionally brittle and tend to crack or break during manufacturing, shipping, and installation. Although wood is strong and flexible, it rots, warps, and discolors as it weathers.

Installation of some of the present surface coverings requires the use of special installation techniques. Also, some installations require subsequent applications of an adhesive, filling of the joints with grout, or chemically bonding and heat welding seams that results from the installation of multiple sections (e.g., tiles or sheets) of the surface covering. Such procedures are substantially more costly and labor intensive, and are not always aesthetically, structurally, or functionally satisfactory, over an extended period of time. For example, a typical tile installation consists of 6% or more porous grout area. The grout area is easily stained and readily promotes bacteria, fungal, and mold growth. It requires labor intensive buffing or polishing, to maintain the top finish and, after an extended period of time, it also becomes necessary to re-grout most areas surrounding the tiles due to discoloration and sanitary concerns.

SUMMARY OF THE INVENTION

In one aspect, the invention features a surface-covering article that includes a top layer, a bottom layer, and reinforcing layer. The top layer is made of a first type of resin. The bottom layer is made of a second type of resin. The second type of resin of the bottom layer chemically bonds with the first type of resin of the top layer to join the bottom layer and the top layer. The reinforcing layer is disposed between the top layer and bottom layer and includes a material to distribute a load force throughout the reinforcing layer when the load force is applied to the surface-covering article.

In another aspect, the invention features a method of installing a surface-covering article on a substrate. The method includes applying a first resin layer to the substrate surface, setting a surface-covering article in the first resin layer, applying a second resin layer to a top surface of the surface-covering article, and curing the resin layers to encapsulate the surface-covering article between the layers. The surface covering article includes a bottom layer, a top layer, and a reinforcing layer disposed between the bottom layer and the top layer. The surface-covering article is capable of bonding with the second resin layer.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

As general overview, surface-covering articles and a seamless flooring system are described. Surface-covering articles (e.g., tiles and sheets) are constructed of various resin and intermediate layers. The surface-covering articles include a reinforcing material encapsulated within the resin to provide dimensional stability for the surface-covering articles.

Installation of the surface-covering articles includes applying to a substrate an undercoat of a similar or of the same resin base used to manufacture the surface-covering articles. A technician sets the surface-covering articles within the resin layer and then applies a top coat of the resin. The undercoat and top coat encapsulate the surface-covering articles. The top surface is seamless because the resins used for the undercoat, top coat, and surface-covering articles are chosen such that they bond, adhere, or chemically bond with one another. The term seamless, as used herein, refers to a surface that is void of penetrable surface area. As such, water or other contaminates are not able to erode the surface-covering articles or layers of material used to install the surface-covering articles.

Figure 1:
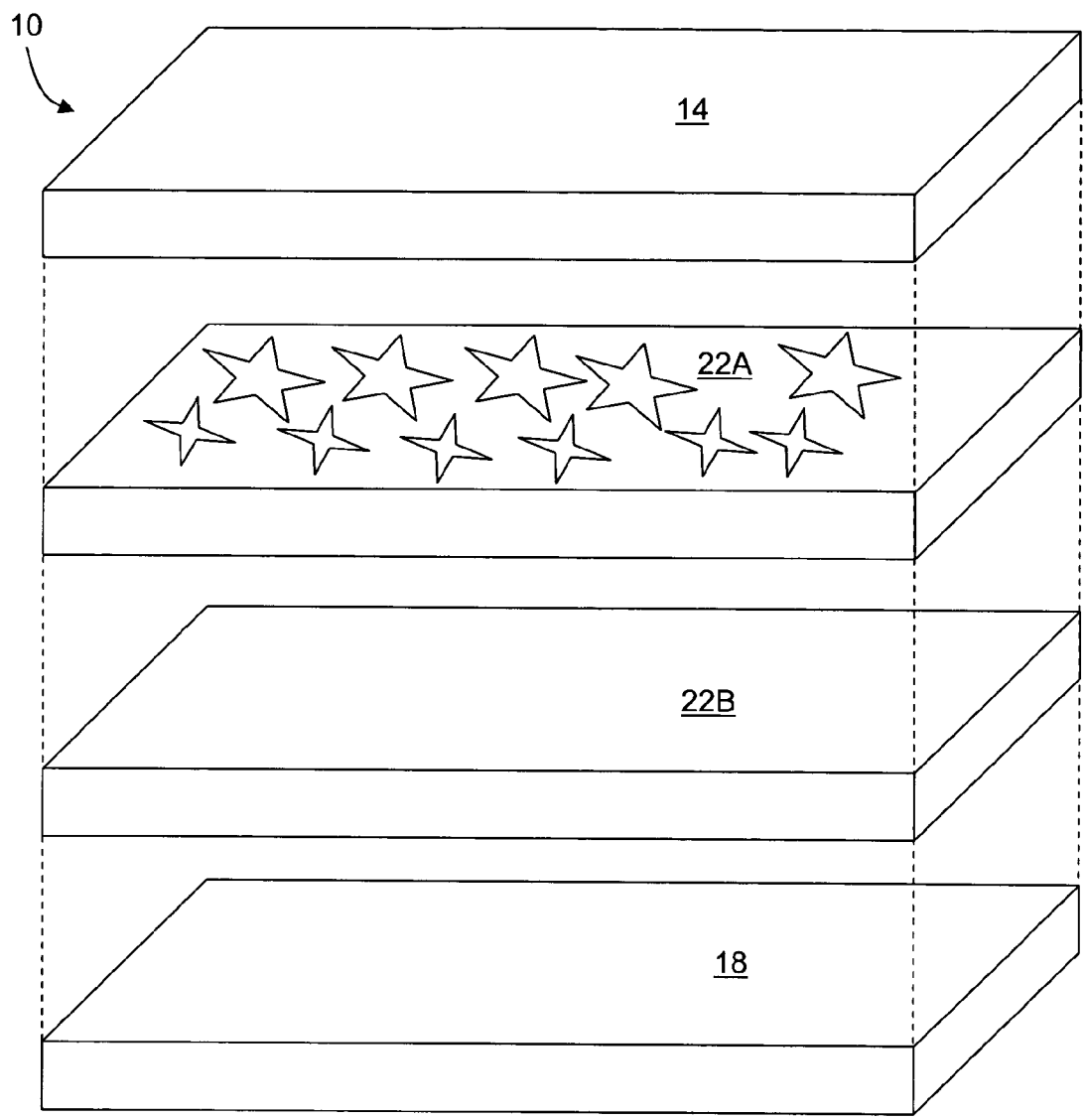
FIG. 1 is an exploded view of an embodiment of a surface-covering article constructed according to principles of the invention.

With reference to FIG. 1, one embodiment of a surface-covering article 10 of the surface covering system includes a top layer 14, a bottom layer 18, a first intermediate layer 22A, and a second intermediate layer 22B, disposed between the top layer 14 and the bottom layer 18. In one embodiment, the first intermediate layer 22A is a decorative layer and the second intermediate layer 22B is a reinforcing layer. The top layer 14 and the bottom layer 18 sandwiches and encapsulate the intermediate layers 22A, 22B.

In one embodiment, the top layer 14 is a liquid curable resin. Examples of liquid curable resins include but are not limited to, compositions such as phenols, saturated polyesters, unsaturated polyesters, polymers, methylmethacrylates, acrylics, bisphenols, isophthatics, orthophthalics, terephalics, thrixotropics, non-thrixotropics, bisphenol fumerates, urethanes, thermoplastics, and epoxy. In one embodiment, the top layer 14 is DEGADUR™ or DEGAMENT™, which are methylmethacrylate based resin products, sold by Degussa/Rohm America, LLC of Piscataway, N.J. This resin is a "self-leveling" resin. Using a self-leveling resin ensures the top surface of the surface-covering article is level. The top layer 14 varies in thickness depending on the application and desired aesthetics features of the surface-covering article 10. The top layer 14 can be transparent or pigmented depending on the application and desired aesthetic qualities of the surface-covering article 10. The top layer 14 can be smooth or have protrusions therefrom to provide slip resistance.

Similarly, the bottom layer 18 is a liquid curable resin. In one embodiment, the bottom layer 18 is the same resin as the top layer 14. In another embodiment, the bottom layer 18 is a different resin than the top layer 14. The resins used for each of the bottom layer 18 and the top layer 14 are chosen based on their chemical properties such that when the resins cure a bond is formed. The bottom layer 18 can be smooth or have protrusions therefrom to provide increased adhesion. The surface-covering article 10 is similar in composition through its thickness, with the exception of the intermediate layers 22A, 22B. In one embodiment, a chemical bond is formed between the bottom layer 18 and the top layer 14.

The first intermediate layer 22A is a decorative layer. In one embodiment, the decorative layer is porous. This allows the resin of the bottom layer 18 to bond with the resin of the top layer 14. The bonding of the resins sandwiches the first intermediate layer 22A between the top layer 14 and the bottom layer 18. Also, the resins encapsulate (i.e., surround) the first intermediate layer 22A to suspend the first intermediate layer 22A within the surface-covering article 10. In one embodiment, the first intermediate layer 22A is constructed of fabric and includes a pattern (e.g., mosaic) printed thereon. The printed pattern is seen through the top layer 14 to provide an aesthetic feature for the surface-covering article 10. Other materials can be used at the decorative layer 22A. For example, natural materials such as fabric, leaves, metallic particles, gold leaf, resin beads, mica, stone chips, and flakes can be used.

In one embodiment, the second intermediate layer 22B is a reinforcing layer. Similar to the first intermediate layer 22A, the second intermediate layer 22B can be porous to allow the resins of the top layer 14 and the bottom layer 18 to seep through the second intermediate layer 22B. As such, both the first intermediate layer 22A and the second intermediate layer 22B are sandwiched and encapsulated between the top layer 14 and the bottom layer 18. In one embodiment, the second intermediate layer 22B is a fiberglass material, such as a fine spun fiberglass material. The fine spun fiberglass material can be TEXTUREGLAS sold by Roos International Ltd of Deerfield Beach, Fla.

The second intermediate layer 22B provides a weight distribution property for the surface-covering article 10. The fine spun fiberglass material prevents warping of the surface-covering article after installation. Forces applied to the surface-covering article 10 are dispersed through the second intermediate layer 22B. Additionally, the fine spun fiberglass material provides dimensional stability and strength to the surface-covering article 10. This prevents cracking of the surface-covering article 10.

Figure 2:
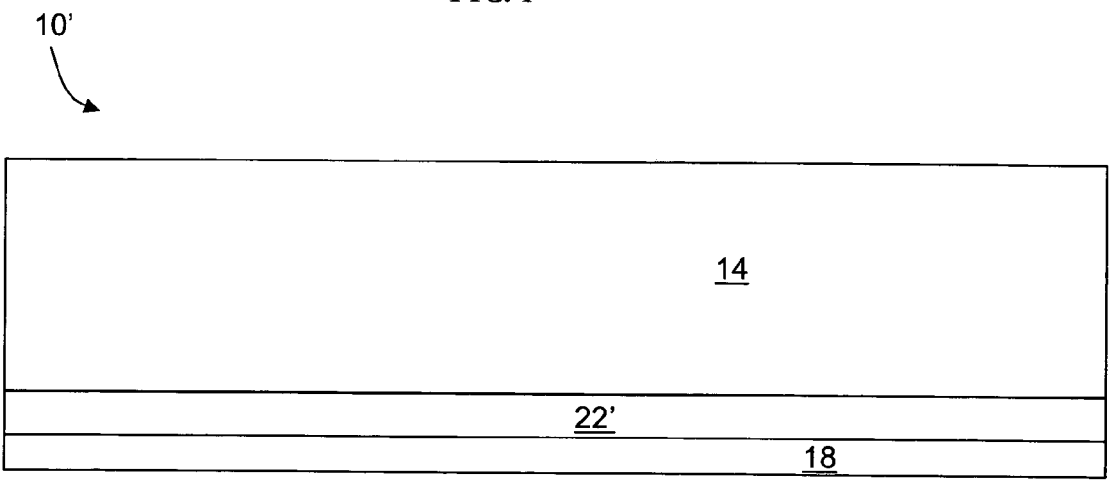
FIG. 2 is a side view of another embodiment of a surface-covering article constructed according to principles of the invention.

FIG. 2 depicts a side view of an embodiment of a surface-covering article 10' that is constructed as a tile. As shown, the top layer 14 and bottom layer 18 encapsulate a single intermediate layer 22'. In this embodiment, a pattern is printed on a fine spun fiberglass layer, which is disposed between the transparent top layer 14 and the bottom layer 18. Alternatively, the top layer 14 is pigmented and no pattern is printed on the intermediate layer 22'. Although shown as having only a single intermediate layer 22', the tile can have any number of intermediate layers.

Although shown as a tile, the surface-covering article 10' can be constructed in various shapes (e.g., a sheet, plank, or some other shape) depending on the intended application. Additionally, because the surface-covering article 10' is resin-based it can be thermoformed into a variety of shapes after it is initially formed. This allows the surface-covering article to be custom fitted around corners and other irregularities if needed. In one exemplary embodiment, the surface-covering article 10' is a tile of dimensions one foot in length, one foot in width, and one-half inch thick.

Figure 3:
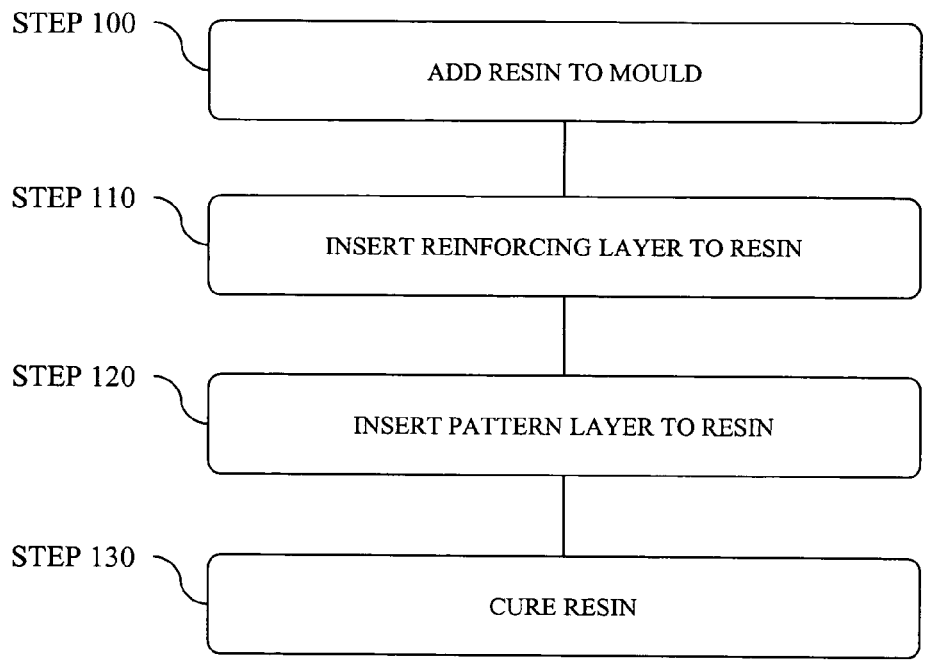
FIG. 3 is a flow chart depicting one embodiment of a method of constructing a surface covering according to principles of the invention.

FIG. 3 depicts one embodiment of a method of fabricating the surface-covering article 10 according to principles of the invention. A human or a machine adds (STEP 100) a resin that forms the bottom layer 18 to a cast or mold. The mold can have a wide variety of shapes and sizes. In one embodiment, the mold is shaped like a square to create a tile type surface-covering article 10'. The mold typically is lined with rubber to prevent the resin from adhering to the sides and bottom of the mold. As the resin cures, the machine or human adds (STEP 110) the second intermediate layer (e.g., the fiberglass layer). The first intermediate layer 22A (i.e., decorative layer) is added (STEP 120) next. In one embodiment, a thin layer of resin is placed between the first intermediate layer 22A and the second intermediate layer 22B. To fabricate the surface covering article 10' of FIG. 2, only a single intermediate layer 22' is added during the fabrication process.

After the desired number of intermediate layers is in place, the top layer 14 is added by pouring (STEP 130) resin into the mold. The top layer 14 can be the same resin as the bottom layer 18 or a different resin. Preferably, the resin chosen for the top layer 14 is a self-leveling resin. Using a self-leveling resin ensures that the top surface of the surface-covering article 10 is smooth and level. After adding the resin for the top layer 14 to the mold, the resin in the mold is cured to create the surface-covering article 10. Curing can take place naturally or be activated by a curing source such as ultra-violet light. The type of resin used determines the curing process.

Figure 4:
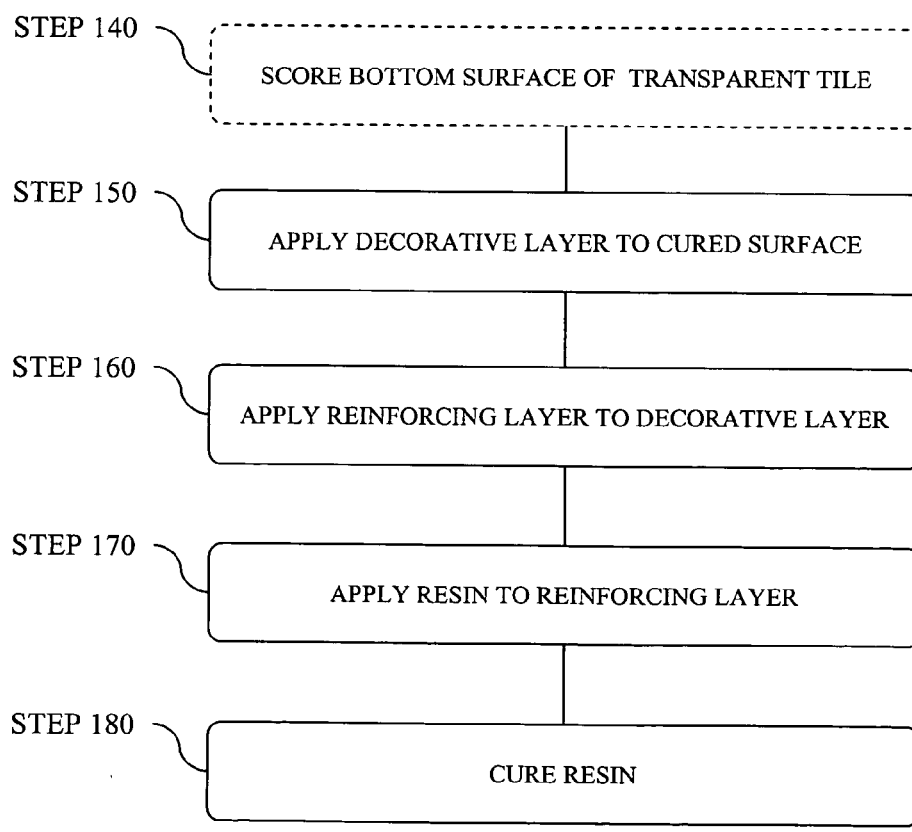
FIG. 4 is a flow chart depicting another embodiment of a method of constructing a surface covering according to principles of the invention.

FIG. 4 shows another embodiment of a method for making a surface-covering article according to principles of the invention. In one embodiment, a transparent top layer 14 is formed by curing resin into a desired shape. Alternatively, the top layer 14 can be a commercial available transparent resin based tile such as a VARIA panel sold by 3Form Corporation of Salt Lake City, Utah. In such an embodiment, the bottom surface and/or the top surface of the tile may need to be scored (STEP 140) or "roughed-up" (e.g., using sand paper) to create a bonding surface. The first intermediate layer 22A is applied (STEP 150) to one of the scored surfaces. The second intermediate layer 22B (e.g., the reinforcing layer) is applied (STEP 160) after the first intermediate layer 22A. Resin is applied (STEP 170) to the second intermediate layer 22B. The resin makes contact with one of the scored surfaces of the top layer 14. As the applied resin cures (STEP 180), it bonds to the scored surface of the top layer 14 because the top layer 14 is constructed of a resin-based composition. After curing, the applied resin forms the bottom layer 18 of the surface-covering article.

Figure 5:
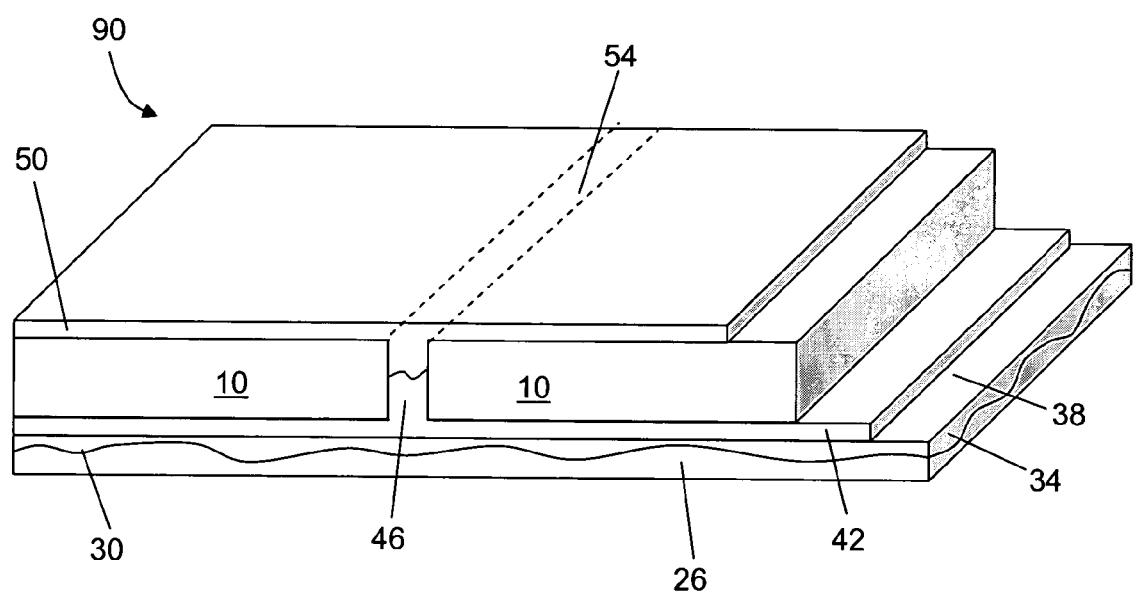
FIG. 5 is a section view of an embodiment of an installation of a surface covering system according to principles of the invention.

FIG. 5 depicts a sectional view of a surface covering system 90 using the surface-covering articles 10 constructed according to principles of the invention. In one embodiment, the system 90 includes various layers of resin applied to a substrate and surface-covering articles 10. The resin layers encapsulate the surface-covering articles 10 and create a seamless and continuous surface.

As shown, a substrate 26 (e.g., a sub-floor or table top) has an uneven top surface 30. A first layer 34 of self-leveling resin is applied to the top surface 30 of the substrate 26. When the first layer 34 of self-leveling resin cures, a substantially level top surface 38 exists. In an alternative embodiment, the substrate 26 has a level top surface 30 which does not require the first layer of resin 34. A slurry layer 42 covers the top surface 38. The slurry layer 42 is another layer of resin that is applied to the top surface 38. The slurry layer 42 can also be self-leveling. A plurality of surface-covering articles 10 are set into the slurry layer 42 before the slurry layer 42 cures completely. Once the surface covering articles 10 are set in place, the slurry layer 42 can be allowed to cure.

The surface-covering articles 10 can be abutted against one another or spaced apart from each other, as shown. When the surface-covering articles 10 are spaced from each other a void 46 exists between the surface-covering articles 10. A portion of the slurry layer 42 is displaced into the void 46. After setting the surface-covering articles 10, a top coat 50 is applied. The top coat 50 is also a resin of similar chemical composition to the slurry layer 42, and the resins of the top surface 14 and bottom surface 18 of the surface-covering articles 10. The top coat 50 may fill any remaining space within the void 46. This creates a level seamless top surface of similar chemical composition as the underlying layers 34, 42, top coat 50, and surface-covering articles 10. In an alternate embodiment, the top coat 50 only partially fills the remaining space with the void 46. As such, the top coat 50 appears to have "grout-lines," although the top surface 50 is seamless. As the top coat 50 and slurry layer 42 cure, a bond forms between the layers 34, 42, the top coat 50, and the surface-covering articles 10. In one embodiment, a chemical bond is formed between the layers 34, 42, 50 and the surface covering articles 10.

In one embodiment, a self-leveling resin forms the top coat 50. Using a resin provides a system 90 that has a resistance to water, fluids, stains, germs, bacteria, acid, thermal shock, and fading by ultraviolet light because of the chemical properties of the resin. Also the top surface 50 is renewable and repairable, because an additional layer of self-leveling resin can be applied directly to the top coat 50.

Figure 6:
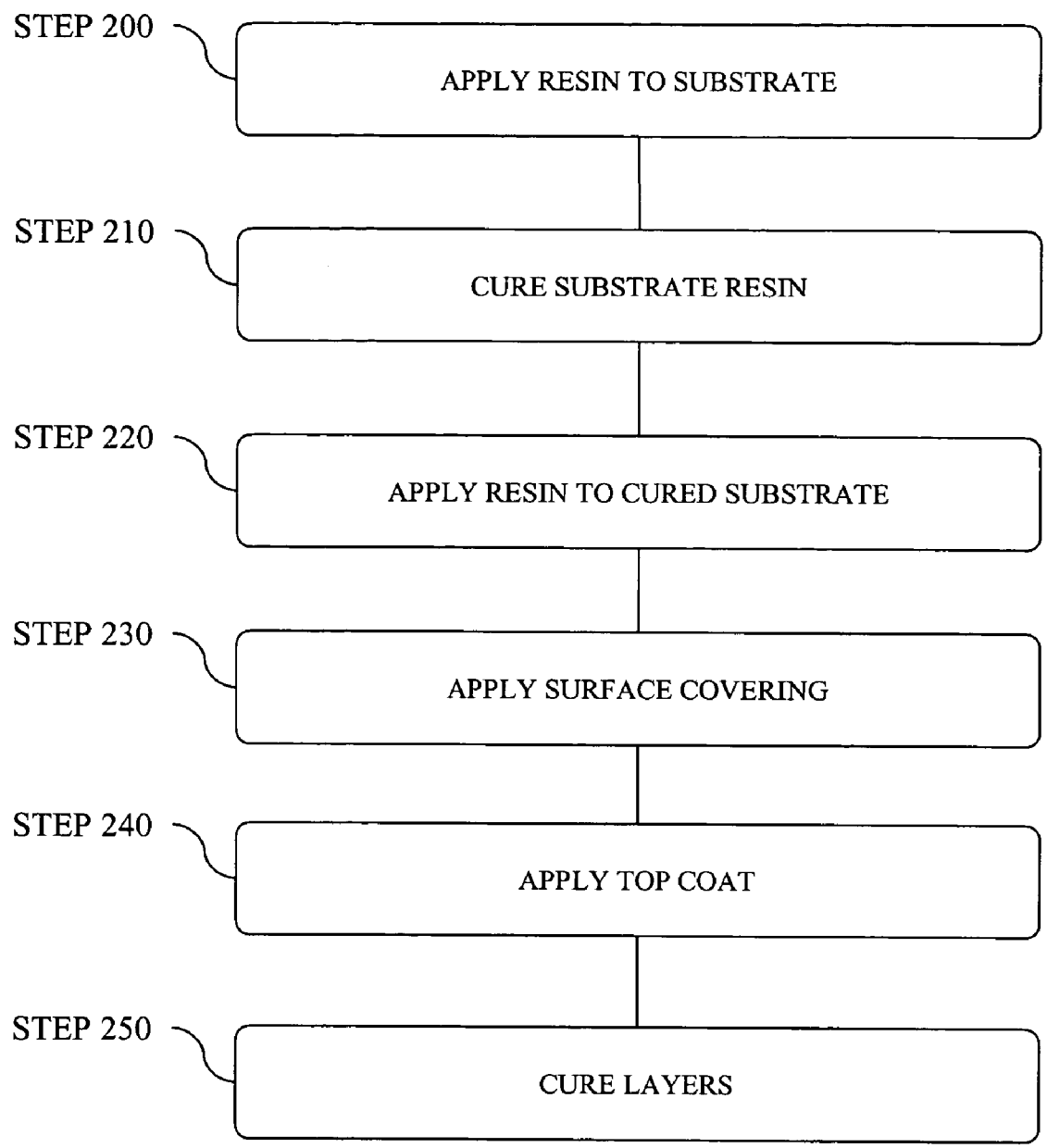
FIG. 6 is a flow chart of an embodiment of a method of installing the surface covering system according to principles of the invention.

FIG. 6 depicts an embodiment of a method of installing a seamless surface covering system 90 according to principles of the invention. In one embodiment, the substrate 26 is not level. As such, a technician prepares the substrate 26 by applying (STEP 200) a layer 34 of self-leveling resin to the substrate 26. As the leveling layer 34 cures (STEP 210), the leveling layer 34 creates the level top surface 38. Once a level top surface 38 exists, the installation technician applies (STEP 220) the slurry layer 42. As the slurry layer 42 cures, the installation technician sets (STEP 230) the surface-covering articles 10 into the slurry layer 42. The curing time of the slurry layer determines the number of surface-covering articles that can be applied. Application (STEP 240) of the top coat 50 begins after the desired number of surface-covering articles 10 is in place. The slurry layer 42 and top coat 50 cure (STEP 250). Curing creates a bond between the slurry layer 42 and the leveling layer 34. Additionally, a bond forms between the slurry layer 42, the surface-covering articles 10, and the top coat 50. After curing, the surface-covering articles 10 are suspended and encapsulated between the layers 42, 50.

Using a resin of similar chemical composition through the surface-covering article fabrication and installation process obviates the need for adhesive, mastic, grout, chemical and heat welded seams. Additionally, the combination of encapsulated installation layers also serves to seal the joints between the surface-covering articles 10. This creates a vapor barrier and eliminates dirt, debris, and moisture contamination for sanitary and aesthetic purposes. Also, using a resin to form the top surface 50 provides the appearance of one continuous surface covering.

The system 90 allows the surface-covering articles 10 to be used in a variety of applications. For example, the surface-covering articles 10 can be directly applied onto a porous or nonporous surface. The system 90 transitions around curbs, corners, and imperfections. The surface-covering articles can be installed horizontally and vertically. The system can be used for both exterior and interior applications. The system 90 can be used to cover lobby areas, corridors areas, mall and arena areas, restaurants surfaces, retail areas, pool and spa areas, locker rooms and bathing areas, cruise ships and other entertainment vessels, airport terminal areas, outdoor terrace areas, veranda areas, and walkway areas, counter tops, work stations and vanity areas.

While the invention has been shown and described with reference to specific preferred embodiments, it should be understood by those skilled in the art that various changes in form and detail may be made therein without departing from the spirit and scope of the invention as defined by the following claims. For example, the preceding surface-covering articles, method of creation and installation can be used to create table tops, end tables, counter tops, and any other article requiring a level top surface.

What is claimed is:

1. A method of producing a seamless surface covering made of a plurality of tiles, comprising:
   applying a first layer of resin to one side of a plurality of tiles disposed adjacent to each other;
   applying a second layer of resin to and around another side of the plurality of tiles and into any gap between adjacent tiles to enclose the plurality of tiles within the first and second layers of resin substituted therefor; and
   curing the first and second resin layers to bond the resin layers permanently to each other and to the enclosed plurality of tiles, thereby producing a seamless surface covering made of multiple encapsulated tiles and having a continuous surface of resin that seals said any gap between adjacent tiles.

2. The method of claim 1, further comprising selecting a material for each of the first and second resin layers from the group consisting of phenols, saturated polyesters, unsaturated polyesters, polymers, methylmethacrylates, acrylics, bisphenols, isophthatics, orthophthalics, terephalics, thrixotropics, non-thrixotropics, bisphenol fumerates, urethanes, thermoplastics, and epoxies.

3. The method of claim 1, further comprising:
producing each tile by interposing a layer of reinforcing material between a top resin layer made of a first type of resin and a bottom resin layer made of a second type of resin, each type of resin being capable of bonding chemically with the first and second layers of resin used to produce the seamless surface covering; and
curing the top and bottom resin layers of each tile to produce that tile.

4. The method of claim 3 wherein the layer of reinforcement material comprises a fine spun fiberglass.

5. The method of claim 3, further comprising applying a decorative pattern with the layer of reinforcement material.

6. The method of claim 3, further comprising applying a decorative pattern to one resin layer of one or more of the tiles.

7. The method of claim 1, further comprising selecting the first resin layer and the second resin layer to have the same type of resin base.

8. The method of claim 1, further comprising selecting the first resin layer and the second resin layer to have different types of resin base.

9. The method of claim 1, wherein the step of applying the first resin layer to the plurality of tiles includes the steps of applying the first resin layer to a surface and setting the plurality of tiles into the first resin layer; and further comprising the step of applying a third resin layer to the surface prior to applying the first resin layer to level the surface.

10. The method of claim 1, wherein the step of curing the first and second resin layers includes curing the first resin layer after the first resin layer is applied to one side of the plurality of tiles and before applying the second resin layer.

11. The method of claim 1, wherein the steps of applying the first and second resin layers include applying a self-leveling resin.

12. The method of claim 1, further comprising installing the seamless surface covering as a tabletop.

13. The method of claim 1, wherein the step of applying the first resin layer to the plurality of tiles includes the steps of applying the first resin layer to a vertical surface and setting the plurality of tiles into the first resin layer.

14. The method of claim 1, wherein the step of applying the first resin layer to the plurality of tiles includes the steps of applying the first resin layer to a surface and setting the plurality of tiles into the first resin layer.

15. The method of claim 1, further comprising installing the seamless surface covering on a floor.

16. The method of claim 1, wherein the step of curing the first and second resin layers includes curing the first and second resin layers simultaneously.

17. The method of claim 1, wherein first and second resin layers bond chemically to each other and to the enclosed plurality of tiles.

* * * * *